Sept. 2, 1941.  I. A. WILLIAMS  2,254,558
FASTENING ELEMENT AND METHOD OF MAKING SAME
Original Filed May 27, 1936    3 Sheets-Sheet 1
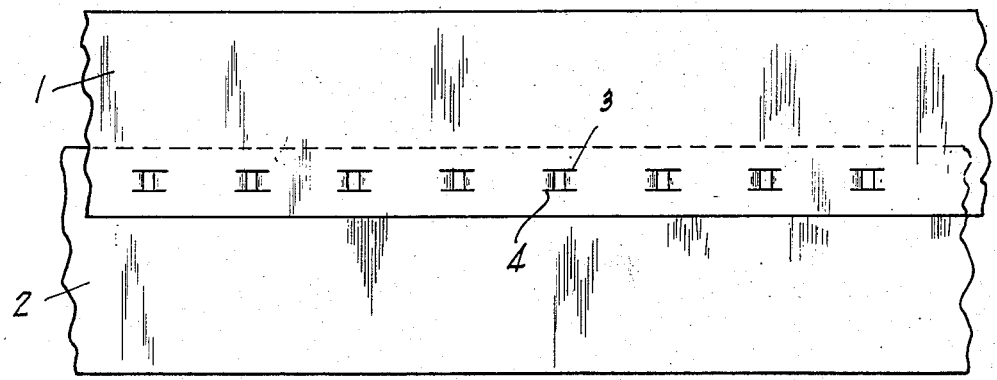
Fig. 1
Fig. 2
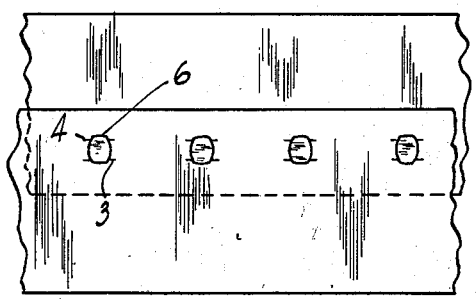
Fig. 3
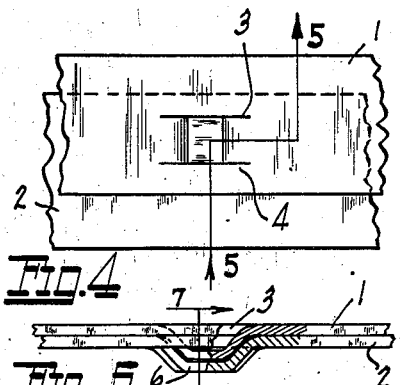
Fig. 4
Fig. 5
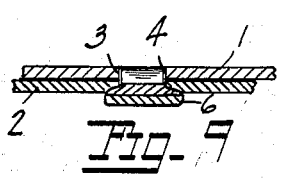
Fig. 9
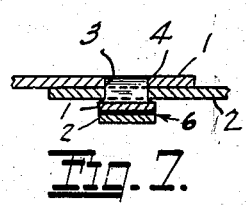
Fig. 7
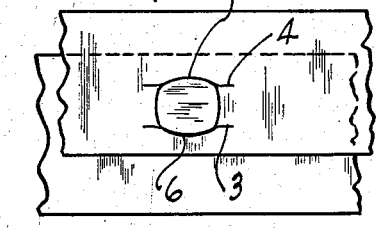
Fig. 6
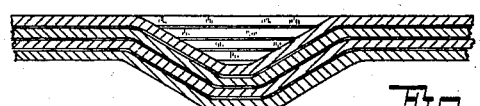
Fig. 8
IVAN A. WILLIAMS
INVENTOR
BY James L. Givnan
ATTORNEY

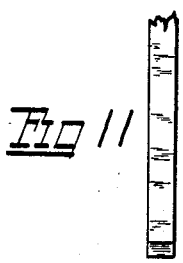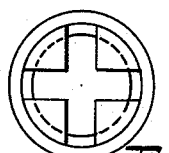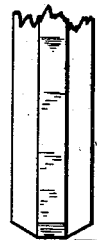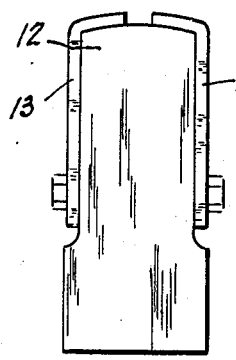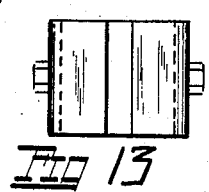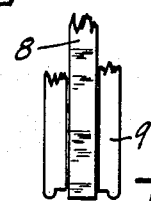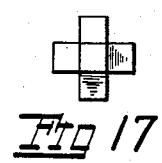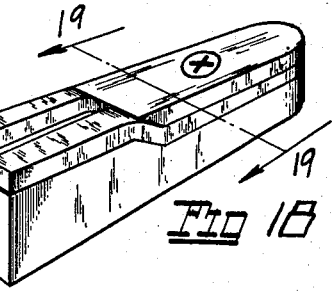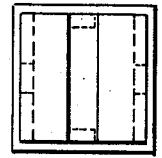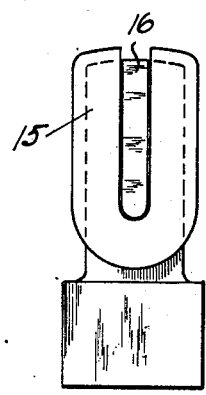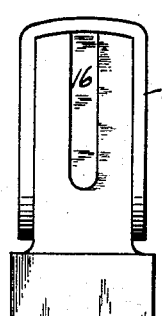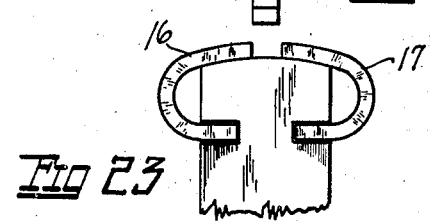

Sept. 2, 1941.                I. A. WILLIAMS                 2,254,558
             FASTENING ELEMENT AND METHOD OF MAKING SAME
                 Original Filed May 27, 1936    3 Sheets-Sheet 3
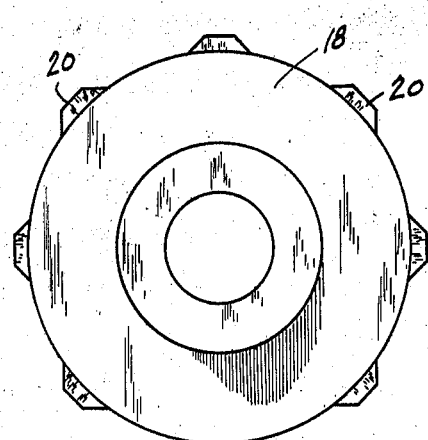
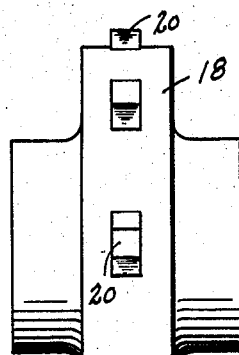
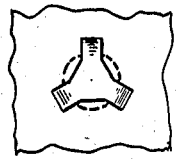
Fig 29
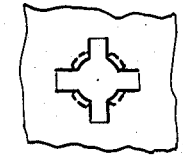
Fig 28
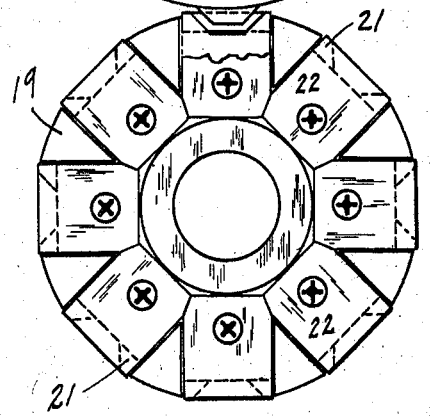
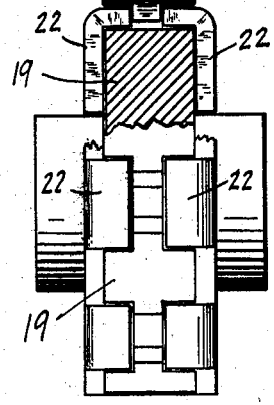
Fig 27
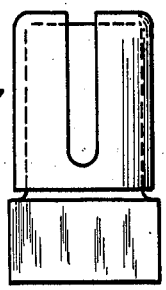
Fig 26
Fig 30    Fig 31    Fig 34
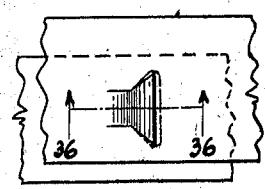
Fig 32
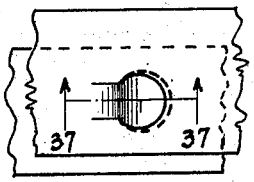
Fig 33
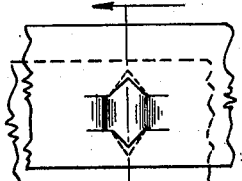
Fig 38
Fig 36    Fig 37    Fig 40    Fig 41
Fig 35    Fig 39
IVAN A. WILLIAMS
INVENTOR
BY James D. Timan
ATTORNEY Patented Sept. 2, 1941

2,254,558

UNITED STATES PATENT OFFICE 2,254,558

FASTENING ELEMENT AND METHOD OF MAKING SAME

Ivan A. Williams, Portland, Oreg.

Substitute for abandoned application Serial No. 82,079, May 27, 1936. This application October 10, 1938, Serial No. 234,210

7 Claims. (Cl. 29—187)

This invention relates to a method and means of securing a plurality of sheets of metal, or other material, together without the use of additional fastening elements, such as clips, rivets and the like. This application is a substitute for my application Serial No. 82,079, filed May 27, 1936.

The invention is characterized by the formation of a fastening means as an integral part of the material being fastened together.

In the principal method of carrying out the invention, I utilize a punch of any suitable design, cooperating with a yieldable die. The punch is advanced through the material in order to produce a number of incisions, in most cases, preferably only two incisions. The metal between the incisions is simultaneously displaced to a plane beneath the lowermost surface of the metal and by further advancement of the punch, is spread laterally to engage beneath the lowermost surface of the material.

One of the principal objects of the invention is the provision of a fastening means of this character which may be accurately produced in rapid succession by any suitable punch actuating mechanism, which also lends itself to the rapid formation of fastening elements in long strips or sheets of metal to be fastened together.

Another object of the invention is the provision of a fastening element of this character which has the same strength and holding qualities of a conventional rivet, but which is much quicker and less expensive to produce and, especially, to apply to the work being dealt with. In the application of rivets, of course, it is first necessary to drill a series of holes through which the rivets are to be passed. Following this, each hole must be aligned with the one beneath it in order to receive the rivet. All of the foregoing operations require considerable time, but with my new and improved method I overcome all these objectionable features, by forming a fastening element or any number of them by a simple punching operation.

These and other objects will appear as my invention is more fully hereinafter described in the following specification, illustrated in the accompanying drawings, and finally pointed out in the appended claims.

In the drawings:

Figure 1 is a fragmentary view of two sheets of material joined together by my fastening means.

Figure 2 is an edgewise view of Figure 1.

Figure 3 is a bottom plan view of a portion of Figure 1 illustrating the formation of the bottom side of the fastening means.

Figure 4 is an enlarged plan view of one of the fastening elements.

Figure 5 is a sectional edgewise view taken on the line 5—5 of Figure 4.

Figure 6 is a bottom plan view of Figure 5.

Figure 7 is a sectional view taken on the line 7—7 of Figure 5.

Figure 8 is an enlarged sectional view through the fastening element when employed to secure a number of sheets of material together.

Figure 9 is a view showing one of the fastening elements compressed by a hammer blow, or any other pressure, in order to flatten the same and to render it water tight.

Figure 10 is a side elevation of one form of die used in producing the fastening element.

Figure 11 is an edgewise view of a punch adapted to cooperate with the die shown in Figure 10.

Figure 12 is a side elevation of Figure 11.

Figure 13 is a top plan view of Figure 10.

Figure 14 is a side elevation of a die of cruciform shape.

Figure 15 is a top plan view of Figure 14.

Figure 16 is a side elevation of a cruciform punch.

Figure 17 is an end elevation of Figure 16.

Figure 18 is a perspective view of a portable die particularly adapted for insertion into tubes or channel members for cooperation with the form of punch illustrated in Figures 11 and 12.

Figure 19 is a sectional view taken on the line 19—19 of Figure 18.

Figure 20 is a side elevation of another form of die.

Figure 21 is a side elevation of the die shown in Figure 20.

Figure 22 is a top plan view of Figure 20.

Figure 23 is a side elevation of a modified form of die.

Figure 24 is a composite view showing another modified form of punch and die.

Figure 25 is also a composite view showing another modified form of punch and die.

Figure 26 is a side elevation of still another form of die designed to produce a fastening element of substantially cruciform shape.

Figure 27 is a top plan view of Figure 26.

Figure 28 is a plan view of a fastening element produced by the die shown in Figures 26 and 27.

Figure 29 is a top plan view of a fastening element somewhat similar to the one shown in Figure 28 except that it has three radiating portions instead of four.

Figure 30 is a side elevation of a series of punches and dies rotatably mounted to cooperate with each other in producing the fastening elements and advancing the material being dealt with.

Figure 31 is an edgewise view of Figure 30.

Figures 32, 33, 34 and 35 illustrate in plan view a variety of shapes of fastening elements all formed in accordance with my invention.

Figure 36 is a sectional view taken on the line 36—36 of Figure 32.

Figure 37 is a sectional view taken on the line 37—37 of Figure 33.

Figure 38 is a sectional view taken on the line 38—38 of Figure 34.

Figure 39 is an edgewise view of Figure 35.

Figure 40 is a sectional view through a fastening element formed by the punches and dies shown in Figures 24 and 25.

Figure 41 is a sectional view through a modified form of fastening element formed by a punch and die whose function is to displace the metal beyond the incisions, rather than the metal between the incisions.

Referring now more particularly to the drawings:

Reference numerals 1 and 2 indicate sheets or strips of material such as metal, fibre or the like, joined together by my new and improved form of fastening element. The fastener, in one of its preferred forms, consists of a pair of parallel incisions 3 and 4 extending entirely through the two or more thicknesses of material to be joined together. The material between the incisions is drawn downwardly, as shown in Figures 5 to 9, to a plane below the lowermost surface of the material. Then the material thus displaced is spread laterally, as at 6, to limits beyond the incisions so as to engage beneath the lowermost surface of the material. The lateral spreading of the displaced material is best illustrated in Figure 7. The fastener thus formed is sufficiently tight to firmly unite the sheets of material together, but if it is desired to render these fasteners water tight, they may be further dealt with, with a hammer or press or any other suitable means for compressing the fastener into the shape shown in Figure 9, wherein it will be seen that a part of the fastener is embedded into the lower piece of material.

As shown in Figure 8, any number of sheets of material may be united by merely using a punch of sufficient cutting area to pierce the combined thicknesses of the material.

The forms of stitches shown in Figures 32 to 39 are formed on the same principle as those above described except that instead of providing parallel incisions, the metal is sheared or punched in the shapes shown, and the metal defined by the sheared or punched portion is displaced to a plane beneath the lowermost surface of the material and is then spread radially in various directions.

The form of stitch shown in Figure 28 is produced by the die shown in Figures 26 and 27 wherein the material is cut along the edges of the radially extending channelways only, and is left uncut around the peripheral walls of the recess 7 in the die. The material defined by the outline of the recess is then moved downwardly and subsequently spread laterally into the dotted line position shown in Figure 28.

The form of stitch shown in section in Figure 40 is made by either form of punch and die shown in Figures 24 and 25. In Figure 24, the punch 8 is embraced by a compressing member 9 slidably mounted on the punch and adapted to spread the cut edges of the material inwardly with respect to the incisions. The punch 8 is first advanced to make the incisions, and is then withdrawn. Immediately following this, the compressing member 9 moves downwardly against the material to not only hold it in place while the punch is being removed, but to also spread the edges of the material inwardly, as aforesaid.

The form of punch shown in Figure 25, is split lengthwise and is yieldable. It is also provided with a compressing member 11 which moves with the punch. The function of the punch is to first form the incisions, and then to collapse and withdraw from the incisions after the compressing member has spread the cut edges of the material inwardly.

The die, shown in Figure 10, consists of an anvil 12 having two half portions, 13 and 14, of a die secured to its side walls. The upper ends of these two half portions are turned toward each other, as shown, and are yieldingly mounted to the anvil so that, as the material between the incisions is compressed against the anvil and spread laterally, the half portions of the die will spread to accommodate the expansion of the material being dealt with. The same applies to all the other forms of dies shown. Each is provided with an anvil, as shown, and provided with a split and yieldable die or punch of any suitable shape. The die shown in Figure 14 is of split tubular formation. The form of die shown in Figures 21 and 22 consists of a bifurcated member 15 adapted to embrace a projection 16 on the anvil for holding the die in place. The form shown in Figure 23 consists of a pair of substantially U-shaped die members 16 and 17 secured to the anvil by suitable notches, as shown, and the amount of spring tension in these members may be regulated by the location of the notches, with respect to the uppermost end of the anvil.

In the form of fastener shown in Figure 41, the material between the incisions remains undisturbed while the material surrounding the incisions is moved downwardly into a lower plane and drawn inwardly to engage beneath the lowermost surface of the material between the incisions.

For convenience in fastening long strips or sheets of material together wherein a great many fasteners would be required, I provide a pair of co-acting wheels 18 and 19. The wheel 18 is formed with a series of punches 20 which may be of any suitable shape. The wheel 19 is provided with a plurality of dies 21 of a shape corresponding to that of the punch. Each die is substantially the same as those above described, in that each die consists of a pair of co-acting and yieldingly mounted plates 22 secured to the side walls of the wheel and embracing its periphery, as shown. These two co-acting wheels not only produce a great many fasteners in rapid succession but, also automatically progress the material being dealt with since one wheel, when rotated, will drive the other wheel in a manner somewhat similar to a pair of co-acting gear wheels and, in so doing, will draw the material between them.

Although I have shown and described a method and means of fastening sheets of material together, it is to be understood that pieces of wire or any other dissimilar pieces of material may be joined together by this process, since it is merely a method of forming incisions through the pieces to be joined together and then displacing the material between the incisions to a plane beneath the material being dealt with. When joining a piece of wire to a piece of material, the incisions are formed through the material only and the wire is flattened beyond the lower edges of the incisions, and thus secured beneath the lower surface of the material.

I claim:

1. A method of uniting a plurality of pieces of material together, consisting in displacing a portion of the top piece below the lower surface of the bottom piece into a plane parallel therewith and then spreading the undisplaced top and bottom pieces inwardly over said displaced portion.

2. A method of uniting a plurality of pieces of material together, consisting in displacing portions of the top and bottom pieces below the lower surface of the bottom piece then spreading said displaced portions inwardly to underlie an undisplaced portion of the top and bottom pieces.

3. A method of uniting a plurality of pieces of material together consisting in shearing spaced incisions entirely through the material, displacing the portion between the incisions to a plane beneath and parallel with the lowermost surface of the material and then expanding the sheared and displaced portion to limits beyond the edges of the incisions.

4. A method of uniting a plurality of pieces of material together consisting in forming spaced incisions entirely through the material, displacing the material between the incisions to a plane beneath and parallel with the bottom surface of the material, and then spreading the displaced material to limits beyond the incisions.

5. A method of uniting a plurality of pieces of material together consisting in forming spaced substantially parallel incisions entirely through the material, displacing the material between the incisions to a plane beneath the bottom surface of the material, and then spreading the displaced material laterally to limits beyond the incisions.

6. A fastener for uniting a plurality of sheets of material together consisting of a portion of each of said sheets depressed into a cavity and parallel with said sheets, each cavity nesting one within the other and having their bottom walls expanded to limits beyond the wall of the cavity and said cavity wall being defined by two laterally spaced incisions.

7. A fastener for uniting a plurality of sheets of material together consisting of aligned portions of said sheets defined by spaced and substantially parallel incisions extending entirely through all of said sheets, said portions between the incisions being disposed beneath the lowermost surface of the sheets in parallel relation thereto and having a greater width than the spacing of the incisions.

IVAN A. WILLIAMS.